(12) United States Patent
Matsumoto (10) Patent No.: US 12,475,937 B2
(45) Date of Patent: Nov. 18, 2025

(54) MEMORY SYSTEM AND CONTROL METHOD

(71) Applicant: Kioxia Corporation, Tokyo (JP)

(72) Inventor: Mariko Matsumoto, Kawasaki Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 167 days.

(21) Appl. No.: 18/456,248

(22) Filed: Aug. 25, 2023

(65) Prior Publication Data

US 2024/0096385 A1 Mar. 21, 2024

(30) Foreign Application Priority Data

Sep. 20, 2022 (JP) ................................ 2022-149629

(51) Int. Cl.
*G11C 7/20* (2006.01)
*G06F 13/42* (2006.01)
*G11C 7/22* (2006.01)

(52) U.S. Cl.
CPC ............ *G11C 7/20* (2013.01); *G06F 13/4221* (2013.01); *G11C 7/22* (2013.01)

(58) Field of Classification Search
CPC .......... G11C 7/20; G11C 7/22; G11C 7/1045; G06F 13/4221
See application file for complete search history.

(56) References Cited

U.S. PATENT DOCUMENTS

| | | | |
|---|---|---|---|
| 10,366,044 B2 * | 7/2019 | Choi | G06F 1/266 |
| 10,452,576 B2 * | 10/2019 | Stuhlsatz | G06F 13/4081 |
| 10,909,047 B2 | 2/2021 | Chen et al. | |
| 2010/0275045 A1 * | 10/2010 | Qin | G06F 1/3237 |
| | | | 713/320 |
| 2016/0170929 A1 * | 6/2016 | Pethe | G06F 13/102 |
| | | | 710/313 |
| 2017/0269675 A1 * | 9/2017 | Klacar | G06F 1/3206 |
| 2017/0315956 A1 * | 11/2017 | Choi | G06F 1/266 |
| 2017/0371814 A1 * | 12/2017 | Stuhlsatz | G06F 13/1689 |
| 2019/0236036 A1 * | 8/2019 | Chen | G06F 13/4282 |

* cited by examiner

*Primary Examiner* — Jay W. Radke
(74) *Attorney, Agent, or Firm* — Foley & Lardner LLP (57) ABSTRACT

A memory system includes a memory, a control circuit, and an interface circuit. The interface circuit includes a first terminal capable of receiving a first clock supplied from an outside, and a second terminal capable of receiving a first signal. When in a first state, the control circuit transitions to a second state in response to input of a first signal, and to a third state in response to input of the first clock. When in the second state, the control circuit executes initialization processing of a first mode for an operation based on an internally generated second clock or is in an operable state in the first mode, and ends the operable state in the first mode in response to input of the first clock and transitions to the third state. When in the third state, the control circuit transitions to a fourth state in response to input of the first signal. When in the fourth state, the control circuit executes initialization processing of a second mode for an operation based on the first clock or is in an operable state in the second mode.

18 Claims, 10 Drawing Sheets

| STATE \ EVENT | RefClk INTERRUPT | PERST INTERRUPT |
|---|---|---|
| (A) INITIAL STATE (RefClk AND PERST INTERRUPTS DO NOT OCCUR) | (C) IS ACHIEVED | (B) IS ACHIEVED START UP INITIALIZATION PROCESSING OF SRIS MODE |
| (B) SRIS MODE STATE (RefClk INTERRUPT DOES NOT OCCUR AND PERST INTERRUPT OCCURS) | (C) IS ACHIEVED START UP INITIALIZATION PROCESSING OF CC MODE | (B) IS MAINTAINED |
| (C) PRE-CC MODE STATE (RefClk INTERRUPT OCCURS AND PERST INTERRUPT DOES NOT OCCUR) | (C) IS MAINTAINED | (D) IS ACHIEVED START UP INITIALIZATION PROCESSING OF CC MODE |
| (D) CC MODE STATE (RefClk AND PERST INTERRUPTS OCCUR) | (D) IS MAINTAINED | (D) IS MAINTAINED |

//\!/MEMORY SYSTEM AND CONTROL METHOD

CROSS-REFERENCE TO RELATED APPLICATION

This application is based upon and claims the benefit of priority from Japanese Patent Application No. 2022-149629, filed Sep. 20, 2022, the entire contents of which are incorporated herein by reference.

FIELD

A memory system including a memory, a control circuit that controls the memory, and an interface circuit that is connected to the control circuit is well known. The memory system can be connected to a host. In a state of being connected to the host, the memory system communicates with the host. Communication between the memory system and the host has a plurality of modes. The mode of communication is switched according to certain conditions.

BACKGROUND

Stabilization of the communication connection between the memory system and the host is desired.

DETAILED DESCRIPTION

At least one embodiment provides stabilization of the communication connection between a memory system and a host.

In general, according to at least one embodiment, a memory system according to at least one embodiment includes a memory, a control circuit configured to control the memory, and an interface circuit coupled to the control circuit. The interface circuit includes a first terminal configured to receive a first clock provided from an outside, and a second terminal configured to receive a first signal. The control circuit is configured to transition from any one of a first state, a second state, a third state, or a fourth state to another state. When in the first state, the control circuit is configured to transition to the second state in response to detection of input of the first signal, and transition to the third state in response to detection of input of the first clock. In addition, when in the second state, the control circuit is configured to (i) execute initialization processing of a first mode of operating the interface circuit based on an internally generated second clock, or be in an operable state in the first mode, and (ii) end the operable state in the first mode in response to the detection of input of the first clock and transitions to the third state. Further, when in the third state, the control circuit is configured to transition to the fourth state in response to the detection of input of the first signal. In addition, when in the fourth state, the control circuit is configured to execute initialization processing of a second mode of operating the interface circuit based on the first clock, or be in an operable state in the second mode.

A memory system according to at least one embodiment will be described in detail with reference to the drawings. Furthermore, the following embodiments are merely examples, and are not intended to limit the present disclosure. In addition, the drawings below are schematic, and for convenience of explanation, some configurations and the like may be omitted. Moreover, the parts which are common to a plurality of embodiments may be given the same reference numerals, and the description thereof may be omitted.

In this specification, a first configuration is "electrically connected" to a second configuration includes a state where the first configuration is directly connected to the second configuration, and a state where the first configuration is connected to the second configuration via wiring, a connection member, a connector, or the like.

First Embodiment

Configuration of Memory System 10

Figure 1:
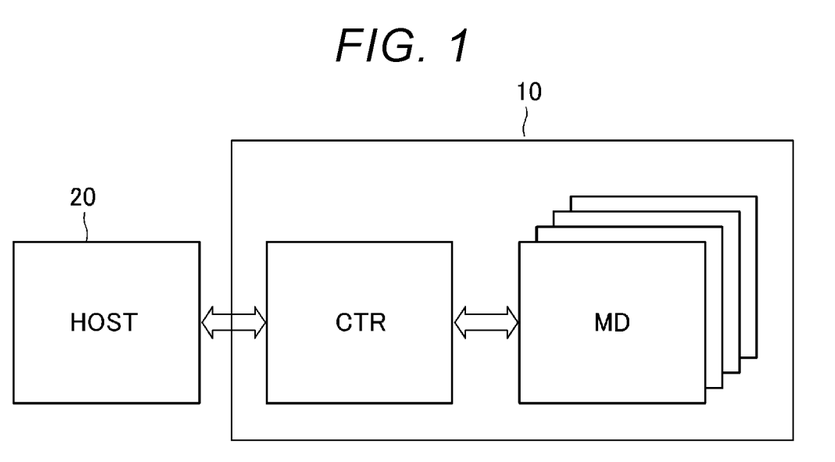
FIG. 1 is a schematic block diagram showing a configuration of a memory system according to a first embodiment.

FIG. 1 is a schematic block diagram showing a configuration of a memory system 10 according to at least one embodiment. The memory system 10 performs read, write, and erase operations to user data according to commands transmitted from a host 20. The memory system 10 is a system capable of storing user data. The memory system 10 is, for example, a solid state drive (SSD). The memory system 10 and the host 20 perform communication by serial communication, for example. The memory system 10 and the host 20 perform communication according to Peripheral Component Interconnect Express (PCIe)™ standard, for example.

The memory system 10 includes a plurality of memory devices MD and a controller CTR. The memory device MD stores user data. The memory device MD is, for example, a NAND flash memory.

The controller CTR is electrically connected to the plurality of memory devices MD and the host 20. The controller CTR controls the memory device MD. The controller CTR is configured as a semiconductor integrated circuit such as a system on a chip (SoC), for example. The controller CTR includes a central processing unit (CPU) die, a PCIe controller (interface circuit) die, and the like. The controller CTR performs processing such as logical address/physical address conversion, bit error detection/correction, garbage collection (that is, compaction), and wear leveling. The functions of each part of the controller CTR can be realized by dedicated hardware, a processor executing a program, or a combination thereof.

Figure 2:
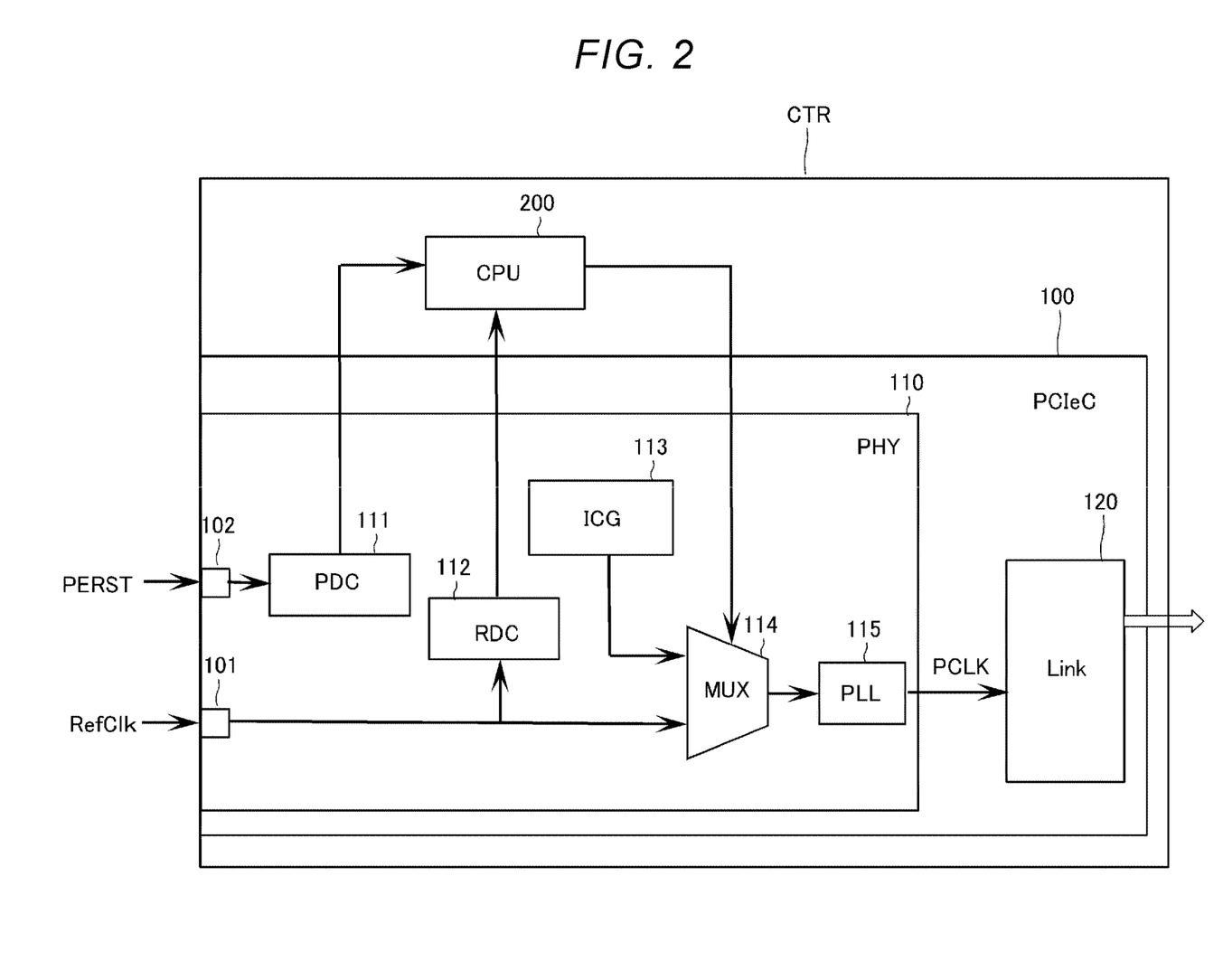
FIG. 2 is a schematic block diagram showing a configuration of part of a controller according to the first embodiment.

FIG. 2 is a schematic block diagram showing a configuration of part of the controller CTR. The controller CTR includes a PCIe controller (PCIeC) 100 corresponding to an interface circuit, and a CPU 200.

PCIe Controller 100

The PCIe controller 100 includes a physical layer control circuit (PHY) 110 and a Link circuit 120. The Link circuit 120 realizes the functions of various protocols such as a medium access control (MAC). The physical layer control circuit 110 is connected to the Link circuit 120 via PHY Interface for the PCI Express Architecture (PIPE).

The physical layer control circuit 110 includes a first terminal 101, a second terminal 102, a PERST detection circuit (PDC) 111, a RefClk detection circuit (RDC) 112, an internal clock generation circuit (ICG) 113, a multiplexer (MUX) 114, and a phase locked loop (PLL) circuit 115.

A RefClk signal transmitted from the host 20 (FIG. 1) is input to the first terminal 101. The RefClk signal corresponds to the first clock. The RefClk signal is a clock signal used by the PCIe controller 100 in a CC mode, which will be described later. The RefClk signal also corresponds to an external clock.

A PERST signal transmitted from the host 20 is input to the second terminal 102. The PERST signal corresponds to the first signal. The PERST signal is transmitted from the host 20 to instruct execution of initialization processing of the PCIe controller 100. The initialization processing includes processing such as Dual/Single determination, SRIS mode/CC mode determination (to be described later), PHY 110 start-up, PCLK stabilization waiting, and MAC start-up.

The PERST detection circuit 111 detects the input of the PERST signal input to the second terminal 102 and outputs the detection to the CPU 200. In addition, the PERST detection circuit 111 may detect a transition from a certain voltage (first voltage) to another voltage (second voltage) at the second terminal as an input of the PERST signal.

The RefClk detection circuit 112 detects the RefClk signal input to the first terminal 101 and outputs the detection to the CPU 200.

The internal clock generation circuit 113 generates an internal clock signal used inside the PCIe controller 100 and outputs the signal to the multiplexer 114. The internal clock signal corresponds to the second clock. The internal clock signal is a clock signal used by the PCIe controller 100 in the SRIS mode, which will be described later.

The multiplexer 114 is a circuit that selects and outputs one signal from a plurality of input signals. The multiplexer 114 outputs either the RefClk signal or the internal clock signal to the PLL circuit 115 according to the selection signal output from the CPU 200.

The PLL circuit 115 adjusts the phase of either the RefClk signal or the internal clock signal, and outputs the signal as an output signal PCLK to the Link circuit 120 in the subsequent stage. The output signal PCLK corresponds to the third clock. The output signal PCLK is used as a clock signal for the Link circuit 120 in the subsequent stage.

CPU 200

The CPU 200 corresponds to a control circuit. For example, the CPU 200 loads various programs stored in the memory device MD (FIG. 1) into a random access memory (RAM) (not shown) and executes the programs, thereby performing the initialization processing.

When the PERST detection circuit 111 detects the input of the PERST signal, the CPU 200 detects that a PERST interrupt occurred. Further, when the RefClk detection circuit 112 detects the input of the RefClk signal, the CPU 200 detects that a RefClk interrupt occurred. The CPU 200 executes an appropriate initialization processing of a clock mode according to a state transition table to be described later in response to occurrence of the PERST interrupt and occurrence of the RefClk interrupt.

Clock Mode

The memory system 10 is operable in two clock modes: a common clock (CC) mode and a separate reference independent spread (SRIS) mode.

In the PCIe standard, the CC mode is a method in which a host and a PCIe device perform communication in synchronization with a RefClk signal generated by the host. In addition, in the PCIe standard, the SRIS mode is a method in which the host and the PCIe device perform communication using separately generated clocks without using the RefClk signal.

The PCIe controller 100 corresponds to a PCIe device in the PCIe standard. The SRIS mode corresponds to the first mode, and the CC mode corresponds to the second mode.

Initialization Processing

Figure 3:
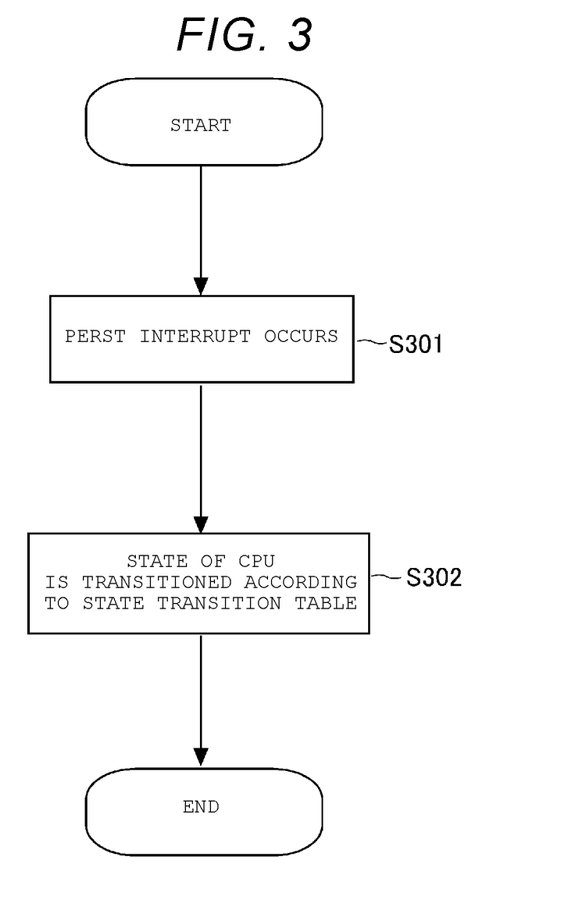
FIG. 3 is a flowchart illustrating a processing when a PERST interrupt occurs according to the first embodiment.
Figure 4:
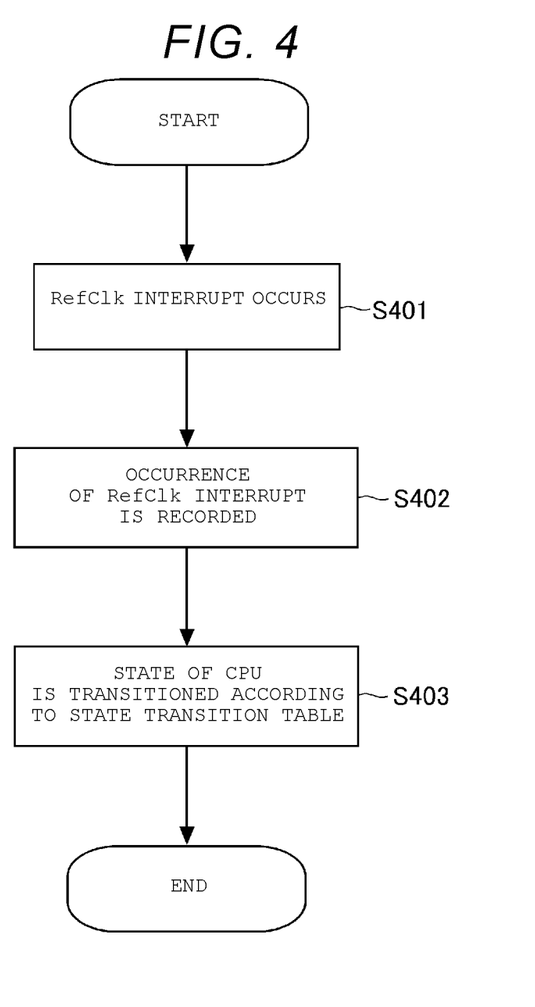
FIG. 4 is a flowchart illustrating a processing when a RefClk interrupt occurs according to the first embodiment.
Figure 5:
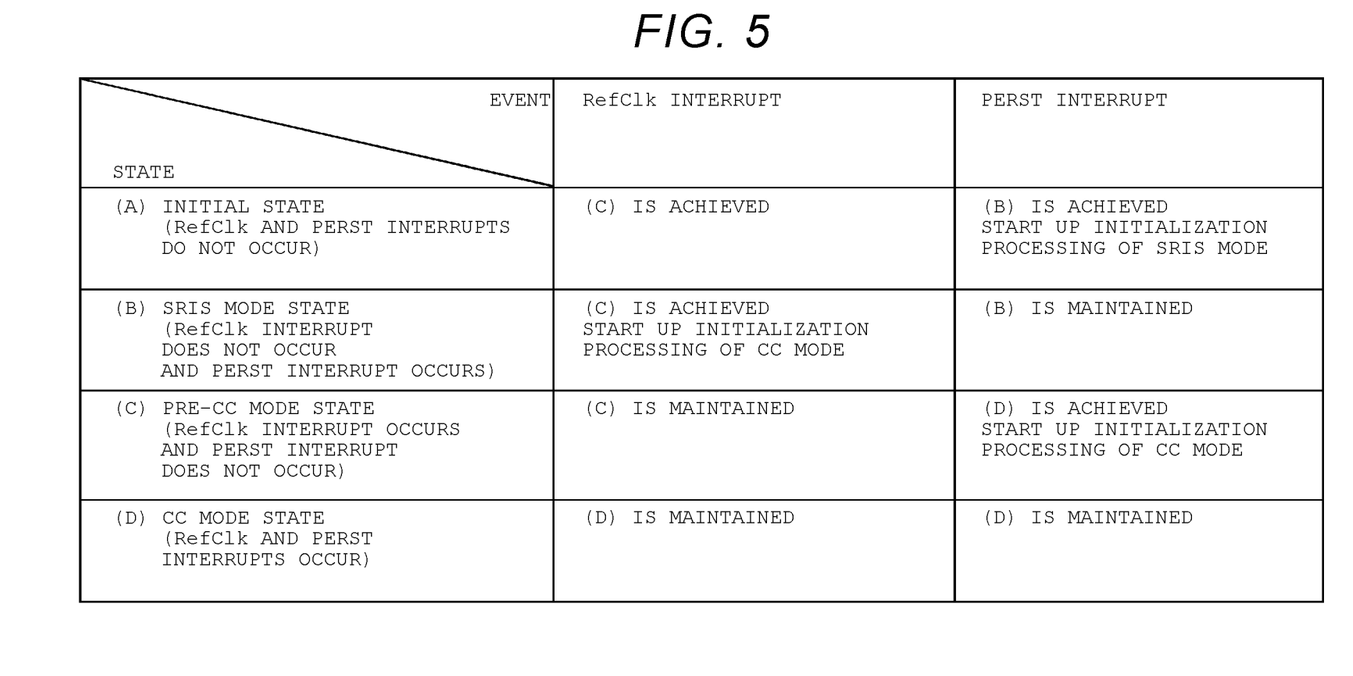
FIG. 5 is a state transition table illustrating a clock mode selection method according to the first embodiment.
Figure 6:
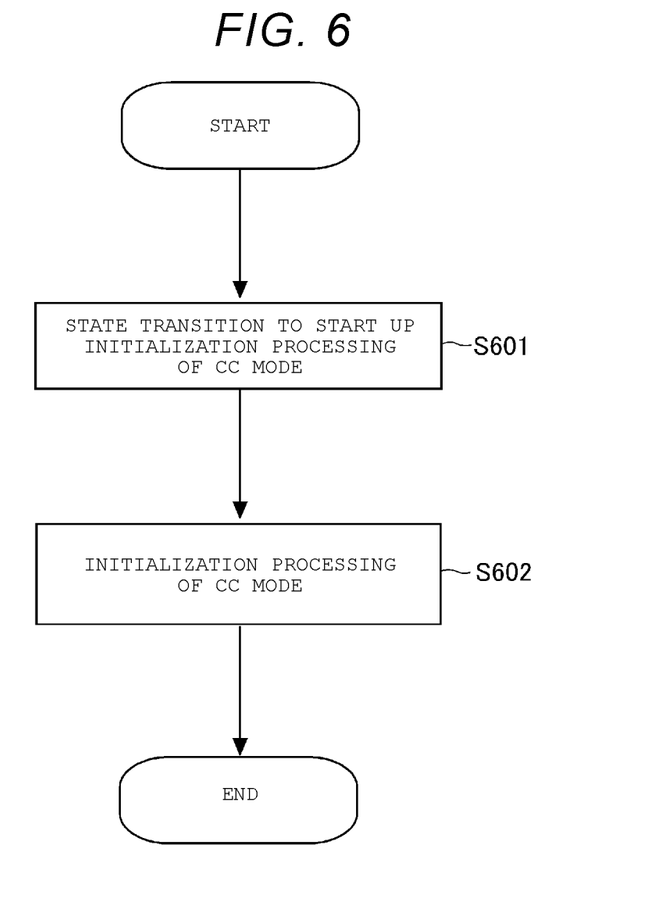
FIG. 6 is a flowchart illustrating an initialization processing of a CC mode according to the first embodiment.
Figure 7:
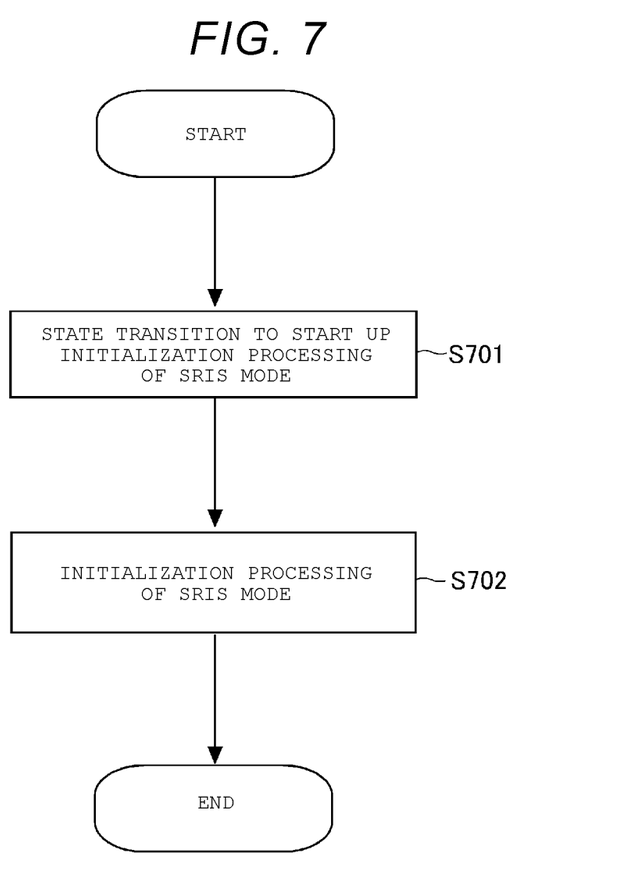
FIG. 7 is a flowchart illustrating an initialization processing of an SRIS mode according to the first embodiment.

FIG. 3 is a flowchart illustrating processing when the PERST interrupt occurs according to the first embodiment. FIG. 4 is a flowchart illustrating processing when the RefClk interrupt occurs according to the first embodiment. FIG. 5 is a state transition table illustrating a clock mode selection method according to the first embodiment. FIG. 6 is a flowchart illustrating initialization processing of a CC mode according to the first embodiment. FIG. 7 is a flowchart illustrating initialization processing of the SRIS mode according to the first embodiment.

The CPU 200 performs the control method of the memory system by executing the processing shown in the flowcharts of FIGS. 3, 4, 6, and 7 and the state transition table of FIG. 5.

As shown in FIG. 3, when the PERST interrupt occurs (S301), the CPU 200 transitions the state of the CPU 200 according to the state transition table of FIG. 5 (S302).

As shown in FIG. 4, when the RefClk interrupt occurs (S401), the CPU 200 records the occurrence of the RefClk interrupt (S402), and transitions the state of the CPU 200 according to the state transition table of FIG. 5 (S403).

In the state transition table shown in FIG. 5, a "state" to be a transition destination is defined in a "cell" specified by a combination of a "state" and an "event". The two columns represent events and correspond to "RefClk interrupt" and "PERST interrupt". Four rows represent four states of the CPU 200 ((A) initial state, (B) SRIS mode state, (C) pre-CC mode state, (D) CC mode state). The CPU 200 can transition from any one of these four states to another state. At the time of transition to the (B) SRIS mode state, the initialization processing of the SRIS mode is executed. After executing this initialization processing, the memory system 10 is in an operable state in the SRIS mode. The (B) SRIS mode state includes the operable state in the SRIS mode. At the time of transition to the (D) CC mode state, the initialization processing of the CC mode is executed. After executing this initialization processing, the memory system 10 is in an operable state in the CC mode. The (D) CC mode state includes the operable state in the CC mode.

The state transition (S302) when the PERST interrupt occurs as described in FIG. 3 will be described with reference to FIG. 5. When the PERST interrupt occurs in the (A) initial state, the CPU 200 transitions to the (B) SRIS mode state. Further, when the PERST interrupt occurs in the (C) pre-CC mode state, the CPU 200 transitions to the (D) CC mode state. On the other hand, even when the PERST interrupt occurs in the (B) SRIS mode state, the CPU 200 does not make a state transition and maintains the (B) SRIS mode state. Similarly, even when the PERST interrupt occurs in the (D) CC mode state, the CPU 200 does not make the state transition and maintains the (D) CC mode state.

In addition, the state transition (S403) when the RefClk interrupt occurs, which was described in FIG. 4, will be described with reference to FIG. 5. When the RefClk interrupt occurs in the (A) initial state, the CPU 200 transitions to the (C) pre-CC mode state. Further, when the RefClk interrupt occurs in the (B) SRIS mode state, the CPU 200 transitions to the (C) pre-CC mode state. On the other hand, even when the RefClk interrupt occurs in the (C) pre-CC mode state, the CPU 200 does not make the state transition and maintains the (C) pre-CC mode state. Similarly, even when the RefClk interrupt occurs in the (D) CC mode state, the CPU 200 does not make the state transition and maintains the (D) CC mode state.

As shown in FIG. 6, the CPU 200 makes a state transition to start up the initialization processing of the CC mode (S601). This state transition includes a case where the CPU 200 transitions from the (B) SRIS mode state to the (C) pre-CC mode state in response to the occurrence of the RefClk interrupt, and a case where the CPU 200 transitions from the (C) pre-CC mode state to the (D) CC mode state in response to the occurrence of the PERST interrupt. After that, the CPU 200 performs the initialization processing of the CC mode (S602), and ends the processing.

As shown in FIG. 7, the CPU 200 makes a state transition to start up the initialization processing of the SRIS mode (S701). This state transition includes a case where the CPU 200 transitions from the (A) initial state to the (B) SRIS mode state in response to the occurrence of the PERST interrupt. After that, the CPU 200 performs the initialization processing of the SRIS mode (S702), and ends the processing.

Comparative Example

Figure 8:
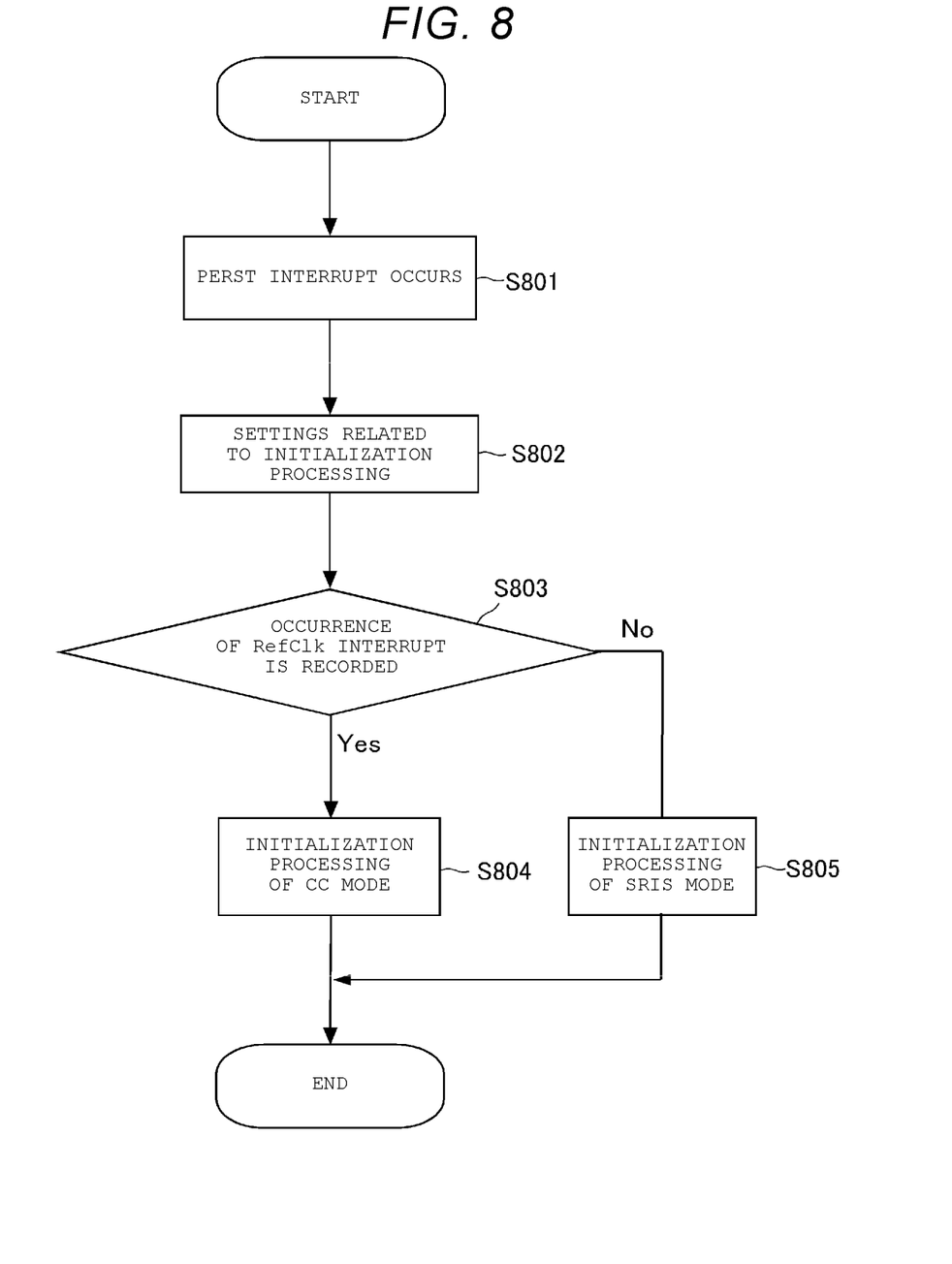
FIG. 8 is a flowchart illustrating a processing when a PERST interrupt occurs according to a Comparative Example.
Figure 9:
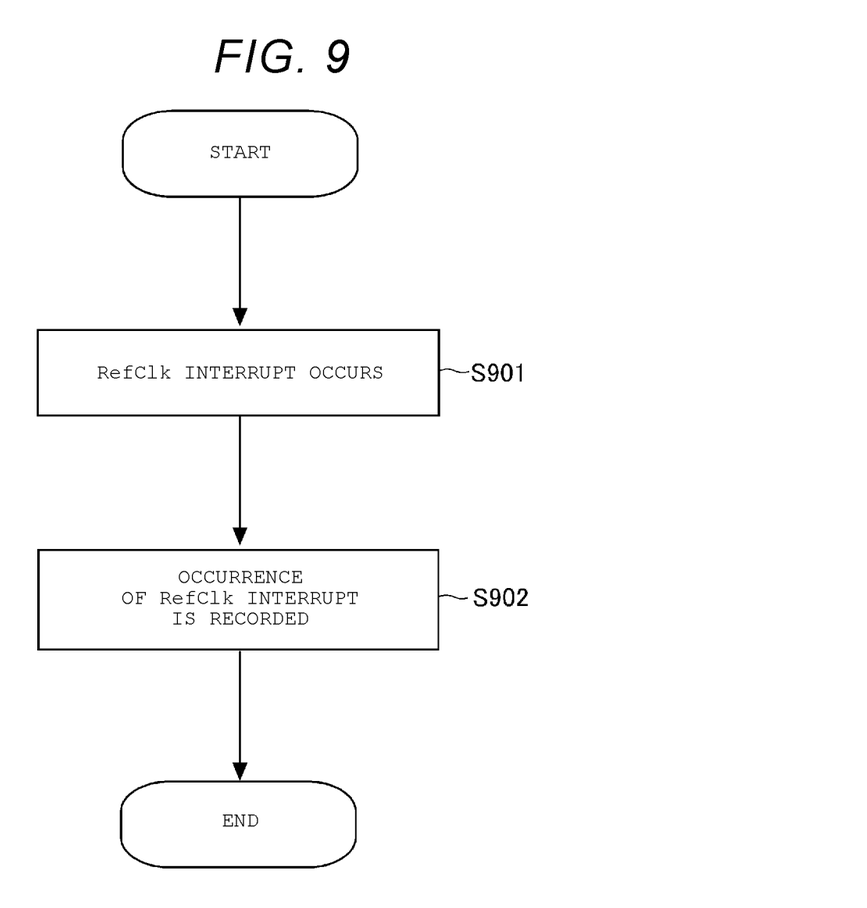
FIG. 9 is a flowchart illustrating a processing when a RefClk interrupt occurs according to the Comparative Example.

Next, a comparative example will be described. The CPU according to the Comparative Example does not execute the processing shown in the state transition table of FIG. 5. FIG. 8 is a flowchart illustrating processing when the PERST interrupt occurs according to the Comparative Example. FIG. 9 is a flowchart illustrating processing when the RefClk interrupt occurs according to the Comparative Example.

As shown in FIG. 8, when the PERST interrupt occurs (S801), the CPU according to the Comparative Example performs settings related to the initialization processing (S802). Next, the CPU determines whether the occurrence of the RefClk interrupt is recorded (S803). When the occurrence of the RefClk interrupt is recorded (Yes in S803), the CPU executes the initialization processing of the CC mode (S804), and when the occurrence of the RefClk interrupt is not recorded (No in S803), the CPU executes the initialization processing of the SRIS mode (S805).

As shown in FIG. 9, when the RefClk interrupt occurs (S901), the CPU according to the Comparative Example records the occurrence of the RefClk interrupt (S902).

Unfixed Potential at Start-Up of Power Source

Figure 10:
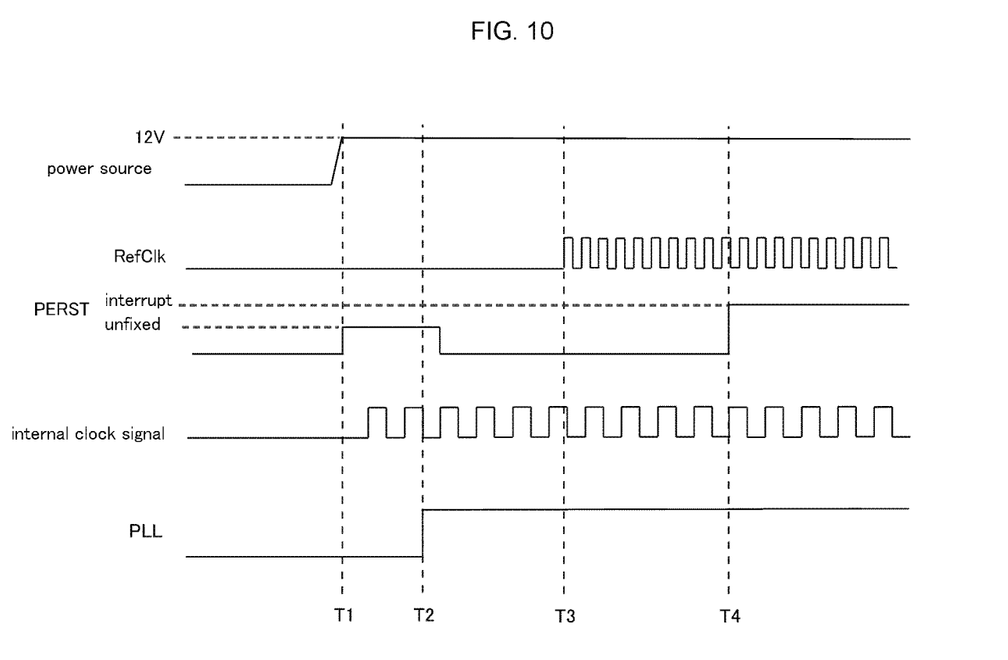
FIG. 10 is a timing chart illustrating an initialization processing of a memory system according to the Comparative Example.

FIG. 10 is a timing chart illustrating memory system initialization processing according to the Comparative Example.

At timing T1, a power source of 12 V is supplied to the memory system. An unfixed potential may occur in the PERST signal depending on the supply of this power source. Due to this unfixed potential, the memory system according to the Comparative Example recognizes that the PERST interrupt occurred (S801), and performs settings related to the initialization processing (S802).

As described above, the memory system according to the Comparative Example determines the clock mode based on whether there is a record of the occurrence of the RefClk interrupt (S803). In the example of FIG. 10, at timing T1, there is no input of the RefClk signal, there is no record of the occurrence of the RefClk interrupt, and thus the SRIS mode is selected (S805). Accordingly, the CPU according to the Comparative Example starts the initialization processing of the SRIS mode based on the internal clock signal at the timing T2 shown in FIG. 10. At timing T3, when the RefClk signal is input from the host, the memory system according to the Comparative Example detects that the RefClk interrupt occurred (S901), and records the occurrence of the RefClk interrupt (S902). However, in the memory system according to the Comparative Example, even when the PERST signal is input at timing T4, the clock mode cannot be changed from the SRIS mode to the CC mode.

In this manner, in the memory system according to the Comparative Example, the clock mode cannot be changed to the CC mode after the initialization processing of the SRIS mode is started. As a result, the host and the memory system may be in a state of using different clock signals, and may be in a state where the link is unstable and is not linked up.

Effects of Memory System 10 According to the First Embodiment

For example, when the PERST signal as shown in FIG. 10 is input to the memory system 10 according to the first embodiment, the CPU 200 transitions from the (A) initial state to the (B) SRIS mode state at timing T1, and starts the initialization processing of the SRIS mode. However, when the RefClk interrupt occurs at timing T3, the CPU 200 transitions from the (B) SRIS mode state to the (C) pre-CC mode state, and further, when the PERST interrupt occurs at timing T4, the CPU 200 transitions from the (C) pre-CC mode state to the (D) CC mode state. That is, in response to the occurrence of the RefClk interrupt in the (B) SRIS mode state and then the occurrence of the PERST interrupt in the (C) pre-CC mode state, the CPU 200 starts the initialization processing of the CC mode. In this manner, even when the initialization processing of the SRIS mode started, it is possible to interrupt this initialization processing and execute the initialization processing of the CC mode. In addition, even when the initialization processing of the SRIS mode is completed, the initialization processing of the CC mode can be executed.

Furthermore, when no communication problem occurs as described with reference to FIG. 10, the CPU 200 transitions from the (A) initial state to the (B) SRIS mode state in response to the occurrence of the PERST interrupt. In addition, the CPU 200 transitions from the (A) initial state to the (C) pre-CC mode state in response to the occurrence of the RefClk interrupt, and transitions from the (C) pre-CC mode state to the (D) CC mode state in response to the occurrence of the PERST interrupt.

Second Embodiment

In the first embodiment, an example of selecting the clock mode according to the state transition table of FIG. 5 was described. However, the selection of the clock mode is not limited to operations according to the state transition table, and rule-based processing may be performed.

For example, the CPU 200 according to a second embodiment interrupts the initialization processing of the SRIS mode during the execution of the initialization processing of the SRIS mode, or ends an operable state in the SRIS mode in the operable state in the SRIS mode, in response to the detection of the input of the RefClk signal to the first terminal 101.

The initialization processing of the CC mode is executed in response to the detection of the input of the PERST signal to the second terminal 102 after the initialization processing of the SRIS mode is interrupted or after the operable state in the SRIS mode is ended.

In this manner, in the second embodiment, even after the initialization processing of the SRIS mode is started, when the RefClk signal is input, the SRIS mode processing can be ended and the initialization processing of the CC mode can be started.

OTHERS

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system comprising:
a memory;
a control circuit configured to control the memory; and
an interface circuit coupled to the control circuit, wherein the interface circuit includes:
   a first terminal configured to receive a first clock provided from an outside, and
   a second terminal configured to receive a first signal, and
the control circuit is configured to:
   transition from any one of a first state, a second state, or a third state to another state,
   when in the first state, transition to the second state in response to detection of input of the first signal, and transition to the third state in response to detection of input of the first clock,
   when in the second state, (i) execute initialization processing of a first mode of operating the interface circuit based on an internally generated second clock, or be in an operable state in the first mode, and (ii) end the operable state in the first mode in response to the detection of input of the first clock and transition to the third state,
   when in the third state, transition to a fourth state in response to the detection of input of the first signal, and
   when in the fourth state, execute initialization processing of a second mode of operating the interface circuit based on the first clock, or be in an operable state in the second mode.

2. The memory system according to claim 1, wherein when in the second state,
   the control circuit is configured to continue the initialization processing of the first mode in response to the detection of input of the first signal during the execution of the initialization processing of the first mode, and
   the control circuit is configured to continue an operation in the first mode in response to the detection of input of the first signal during the operation in the first mode.

3. The memory system according to claim 1, wherein when in the second state, the control circuit is configured to maintain the second state in response to the detection of input of the first signal.

4. The memory system according to claim 1, wherein the interface circuit is configured to operate with a third clock based on one of the first clock and the second clock.

5. The memory system according to claim 1, wherein the first signal includes a transition from a first voltage to a second voltage different from the first voltage.

6. The memory system according to claim 1, wherein the first mode includes a mode that operates with Separate Reference Independent Spread conforming to Peripheral Component Interconnect Express (PCIe) standard, and
the second mode includes a mode that operates with a common clock conforming to Peripheral Component Interconnect Express (PCIe) standard.

7. The memory system according to claim 1, wherein the memory includes a NAND flash memory.

8. A control method of a memory system including a memory, a control circuit configured to control the memory, and an interface circuit configured to receive a first clock and a first signal which are supplied from an outside, wherein the control circuit is configured to:
   transition from any one of a first state, a second state, or a third state to another state, the method comprising:
   when in the first state, transitioning to the second state in response to detection of input of the first signal, and transitioning to the third state in response to detection of input of the first clock,
   when in the second state, (i) executing initialization processing of a first mode for operating the interface circuit based on an internally generated second clock, or being in an operable state in the first mode, and (ii) ending the operable state in the first mode in response to the detection of input of the first clock and transitioning to the third state,
   when in the third state, transitioning to another fourth state in response to the detection of input of the first signal, and
   when in the another state, executing initialization processing of a second mode of operating the interface circuit based on the first clock or being in an operable state in the second mode.

9. The method according to claim 8, further comprising, when in the second state,
   continuing the initialization processing of the first mode in response to the detection of input of the first signal during the execution of the initialization processing of the first mode, and
   continuing an operation in the first mode in response to the detection of input of the first signal during the operation in the first mode.

10. The method according to claim 8, further comprising, when in the second state, maintaining the second state in response to the detection of input of the first signal.

11. The method according to claim 8, wherein the first signal includes a transition from a first voltage to a second voltage different from the first voltage.

12. The method according to claim 8, wherein
the first mode includes a mode that operates with Separate Reference Independent Spread conforming to Peripheral Component Interconnect Express (PCIe) standard, and
the second mode includes a mode that operates with a common clock conforming to Peripheral Component Interconnect Express (PCIe) standard.

13. The method according to claim 8, wherein the memory includes a NAND flash memory.

14. A memory system comprising:
a memory;
a control circuit configured to control the memory; and
an interface circuit connected to the control circuit, wherein
the interface circuit includes:
   a first terminal configured to receive a first clock provided from an outside, and
   a second terminal configured to receive a first signal, and
the control circuit is configured to:
   operate in a first mode for operating the interface circuit based on an internally generated second clock, and a second mode of operating the interface circuit based on the first clock,
   in response to detection of input of the first clock, interrupt initialization processing of the first mode during execution of the initialization processing of the first mode, or end an operable state in the first mode in the operable state in the first mode, and
   execute the initialization processing of the second mode in response to detection of input of the first signal, after the initialization processing of the first mode is interrupted or after the operable state in the first mode is ended.

15. The memory system according to claim 14, wherein the interface circuit is configured to operate with a third clock based on one of the first clock and the second clock.

16. The memory system according to claim 14, wherein the first signal includes a transition from a first voltage to a second voltage different from the first voltage.

17. The memory system according to claim 14, wherein the first mode includes a mode that operates with Separate Reference Independent Spread conforming to Peripheral Component Interconnect Express (PCIe) standard, and
the second mode includes a mode that operates with a common clock conforming to Peripheral Component Interconnect Express (PCIe) standard.

18. The memory system according to claim 14, wherein the memory includes a NAND flash memory.

* * * * *